(12) United States Patent
Belenky et al.

(10) Patent No.: US 8,996,349 B2
(45) Date of Patent: Mar. 31, 2015

(54) SYNCHRONIZING AN ABSTRACT MODEL AND SOURCE CODE

(75) Inventors: Yuri Belenky, Copenhagen (DK); Christian H. Damm, Hillerød (DK); Ronald K. Gabel, Federal Way, WA (US); Michael S. Thomsen, Hillerød (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 1288 days.

(21) Appl. No.: 11/870,658

(22) Filed: Oct. 11, 2007

(65) Prior Publication Data

US 2009/0100405 A1   Apr. 16, 2009

(51) Int. Cl.
*G06F 9/45* (2006.01)
*G06F 9/44* (2006.01)

(52) U.S. Cl.
CPC ...... *G06F 8/10* (2013.01); *G06F 8/355* (2013.01); *G06F 9/4428* (2013.01); *G06F 8/35* (2013.01)
USPC .......................................................... 703/22

(58) Field of Classification Search
USPC ............ 700/30; 717/168, 106, 104, 105, 120, 717/100, 143, 136
See application file for complete search history.

(56) References Cited

U.S. PATENT DOCUMENTS

| | | | | |
|---|---|---|---|---|
| 6,026,401 A * | 2/2000 | Brealey et al. | ........................ | 1/1 |
| 6,502,239 B2 * | 12/2002 | Zgarba et al. | ................ | 717/168 |
| 6,804,682 B1 | 10/2004 | Kemper et al. | | |
| 7,370,315 B1 * | 5/2008 | Lovell et al. | ................... | 717/100 |
| 7,437,614 B2 * | 10/2008 | Haswell et al. | ............ | 714/38.13 |
| 7,480,897 B2 * | 1/2009 | Reinhardt et al. | ............ | 717/120 |
| 7,509,346 B2 * | 3/2009 | Mathew | ................................ | 1/1 |
| 8,121,874 B1 * | 2/2012 | Guheen et al. | ................ | 705/7.11 |
| 2002/0170048 A1 * | 11/2002 | Zgarba et al. | ................ | 717/168 |
| 2004/0088688 A1 * | 5/2004 | Hejlsberg et al. | ............. | 717/143 |
| 2004/0153992 A1 | 8/2004 | Molina-Moreno et al. | | |
| 2004/0243971 A1 | 12/2004 | Leung | | |
| 2005/0065970 A1 | 3/2005 | King et al. | | |
| 2005/0261787 A1 * | 11/2005 | Plante | ............................ | 700/30 |
| 2006/0156282 A1 | 7/2006 | Mathew | | |
| 2006/0168557 A1 | 7/2006 | Agrawal et al. | | |
| 2007/0028208 A1 | 2/2007 | Maki | | |
| 2007/0083859 A1 | 4/2007 | Fussell et al. | | |
| 2007/0209031 A1 * | 9/2007 | Ortal et al. | ..................... | 717/104 |
| 2007/0220481 A1 * | 9/2007 | Gabel et al. | ................... | 717/106 |
| 2007/0234278 A1 * | 10/2007 | Damm et al. | ................. | 717/104 |
| 2008/0046864 A1 * | 2/2008 | Bai et al. | ........................ | 717/105 |
| 2008/0196014 A1 * | 8/2008 | Kulkarni et al. | .............. | 717/136 |

OTHER PUBLICATIONS

Noblet et al. FixD: Fault Detection, Bug Reporting, and Recoverability for Distributed Applications Parallel and Distributed Processing Symposium, 2007, IPDPS 2007, IEEE International, Mar. 2007, pp. 1-8.*

(Continued)

*Primary Examiner* — Omar Fernandez Rivas
*Assistant Examiner* — Cuong Luu
(74) *Attorney, Agent, or Firm* — Damon Rieth; Micky Minhas

(57) ABSTRACT

A software synchronization system detects a change that modifies an element of the abstract model. The software synchronization system globally modifies references to the element throughout the abstract model. Then the software synchronization system automatically determines elements of the source code that are dependent on the changed model element. The software synchronization system modifies the determined elements of the source code. Thus, the software synchronization system synchronizes the abstract model and the source code, regardless of the one to which the developer makes changes.

19 Claims, 5 Drawing Sheets

(56) References Cited

OTHER PUBLICATIONS

Cazzola, W. et al., "Co-Evolving Application Code and Design Models by Exploiting Meta-Data," SAC '07, Mar. 11-15, 2007, Seoul, South Korea (5 pages).

Simonyi, C., et al., "Intentional Software," *OOSPLA '06*, Oct. 22-26, 2006, Portland, Oregon, USA. Available at: <http:// delivery.acm.org/10.1145/1170000/1167511/p451-simonyi.pdf?key1=1167511&key2=8062756811&coll=GUIDE&dl=GUIDE&CFID=26203546&CFTOKEN=27515986> pp. 461-463.

* cited by examiner

SYNCHRONIZING AN ABSTRACT MODEL AND SOURCE CODE

BACKGROUND

A popular way of creating software is using abstract models. An abstract model defines various aspects of a system's behavior at a design level before a developer writes any source code. For example, the abstract model may define the major components of the design and the interfaces between components. Abstract models can also define finer details of software, such as the names of each class that will be in the design, the variables associated with each class, function names and parameters, and so forth. A recent movement called Model-Driven Engineering (MDE) is the systematic use of models as primary engineering artifacts throughout the engineering life cycle. Engineers can apply MDE to software, system, and data engineering. As it pertains to software development, MDE refers to a range of development approaches that are based on the use of software modeling as a primary form of expression. With the introduction of the Unified Modeling Language (UML), MDE has become very popular with a wide body of practitioners and there are many available supporting tools. More advanced types of MDE have expanded to permit industry standards that allow for consistent application and results. The continued evolution of MDE has added an increased focus on the use of models and their role in software development.

Modeling is not useful without a relationship to the eventual building of software code. Therefore, modeling tools are often capable of generating source code from the model. Model-generated source code gives a developer a head start in developing a software system and reduces the chance for errors since the generated code is a close reflection of the model. However, models are insufficient to completely implement the software system, so the developer must often modify the generated code or add additional code to complete the implementation of the system. Often the product is built in two distinct stages: (1) designing and modeling with a modeling tool that ultimately generates a coding framework, and (2) implementing the product based on the generated code.

Unfortunately, the model and source code can quickly become out of sync. If the developer makes changes to the model, then regenerating the generated code based on the model changes may overwrite changes to the generated code made by the developer or may cause developer-added code to fail to interoperate with the regenerated code. As the developer changes a declaration in his abstract model, he is required to (1) manually change all uses of that declaration in other parts of the model, (2) manually trigger a re-generation of all of the generated source code, and (3) manually update all of the additional source code to reflect the change. If the developer makes changes to the code first, then to keep the model in sync he is required to (1) manually perform the same change in the model that corresponds to the change he made in the developer code, (2) manually change all uses of that declaration in other parts of the model, (3) manually trigger a regeneration of all of the generated source code, and (4) manually update all of the developer source code to reflect the change. The large number of manual steps can lead to errors and consume valuable development time.

SUMMARY

A software synchronization system is provided that maintains the association between an abstract software model and source code based on the model. The software synchronization system receives a change that modifies an element of the abstract model. The software synchronization system globally modifies references to the element throughout the abstract model. Then the software synchronization system automatically determines elements of the source code that are dependent on the changed model element. The software synchronization system modifies the determined elements of the source code. Thus, the software synchronization system synchronizes the abstract model and the source code, regardless of the one to which the developer makes changes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
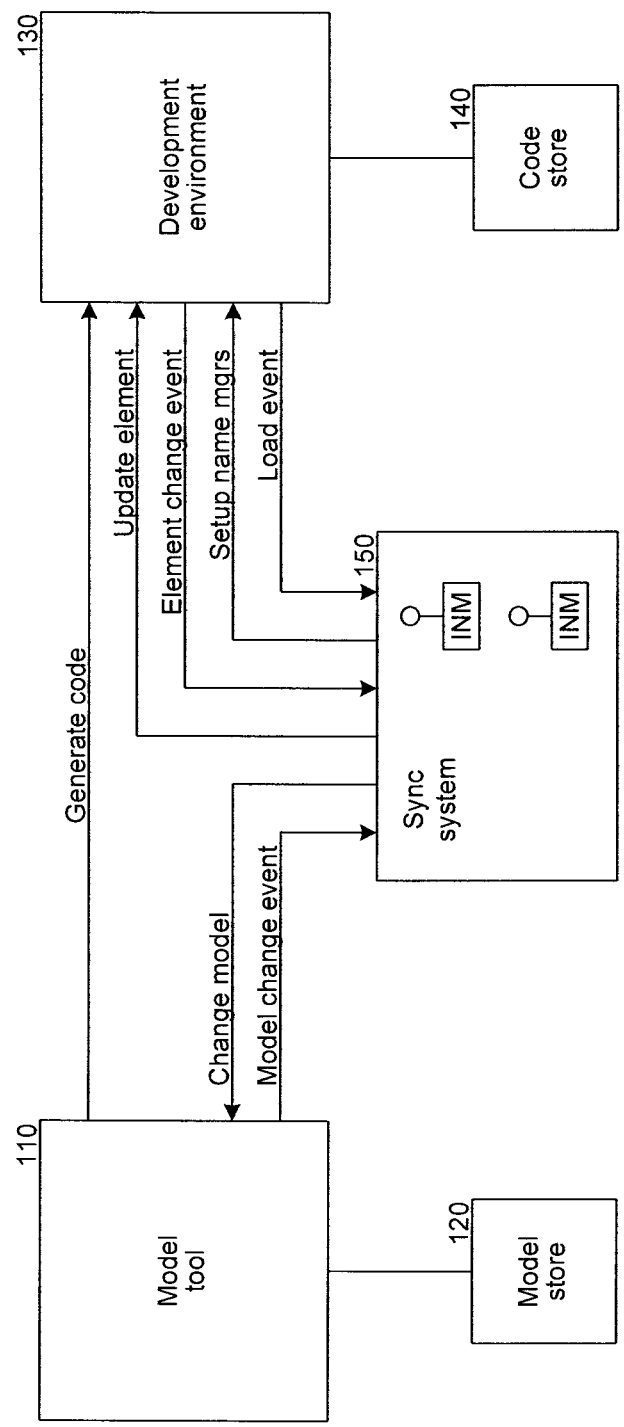
FIG. 1 illustrates an example environment in which the software synchronization system may be used.

A software synchronization system is provided that maintains the association between an abstract software model and source code based on the model. The software synchronization system receives a change that modifies an element of the abstract model. For example, a developer may change the name of a class. The software synchronization system globally modifies references to the element throughout the abstract model. For example, parent and child classes may reference the name of the class, and the software synchronization system renames these references. Then, the software synchronization system automatically determines elements of the source code that are dependent on the changed model element. For example, the source code may contain an implementation of the class, various instantiations of the class, and so forth. The software synchronization system modifies the determined elements of the source code. For example, the software synchronization system may globally rename references to the class name in the source code based on the new name given to the model element by the developer. Thus, the software synchronization system synchronizes the abstract model and the source code, regardless of the one to which the developer makes changes.

In some embodiments, the software synchronization system synchronizes the abstract model and the source code for a variety of types of changes. For example, the developer may rename a variable in the source code that he defined in the model, and the software synchronization system will propagate the renamed variable into the model and throughout the rest of the source code. The developer may also change the return type of a function, a parameter type of a function, add or remove parameters, change the type of a field, change the hierarchical relationship of classes, and so on. In addition, the developer may change the cardinality of a relationship in the model (e.g., from "one" to "many"). In this case, the software synchronization system changes the developer source code accordingly, such as by replacing a single variable with a collection type (e.g., an ICollection derived class when using .NET). Changes can originate in either the abstract model or the source code. For each type of change, the software synchronization system modifies the appropriate elements of both the abstract model and the source code to keep the two in sync.

In some embodiments, the software synchronization system performs changes within a transaction scope. If many parts of the software need to change because of a modification made by a developer, then the developer may want the software synchronization system to make all of the changes or none of the changes. Otherwise, the system could leave the software in a nonworking state. Therefore, the software synchronization system can enforce transaction semantics such that each change is attempted, and if any of the changes fail, the system rolls back all of the previous changes. The software synchronization system commits the transaction when all of the changes in both the abstract model and the source code succeed.

In some embodiments, the software synchronization system uses partial classes to separate generated source code from developer-added source code. A partial class is a class that is divided into two or more parts (e.g., split over multiple files), making it easier to deal with large quantities of code. At compile time, the compiler groups the elements from each part of the partial class together, thus logically making the output the same as if the class were defined in one place. Partial classes can make automatically generated code easier to interpret by separating the generated code from developer-added code. Version 2.0 of the Microsoft .NET Framework introduced partial class support in both C# and Visual Basic-.NET. By using partial classes, the software synchronization system can modify the model and regenerate the generated code without interfering with code that the developer has added. The software synchronization system can then separately propagate a change to the developer-added source code.

Example Environment

FIG. 1 illustrates an example environment in which the software synchronization system may be used. A developer uses a model tool 110 to create an abstract model of the software. For example, the developer may create a model that outlines the major logical objects (e.g., classes) that the software project will contain. The model tool 110 stores the model created by the developer in a model store 120. For example, the model store 120 may be a file on a disk, a database, or another storage device. When the developer is satisfied with the model, the developer instructs the model tool 110 to generate code in accordance with the model. For example, the model tool 110 may create C++ header and source files that define each of the classes and contain placeholders where the developer can fill in additional implementation details. When the code is generated, the model tool 110 passes control to a development environment 130 where the developer can edit the generated code, add additional code, and so forth. The generated code and the code the developer writes are stored in a code store 140.

A software synchronization system 150 introduces the ability to keep the model and code in sync when either the model or the code is changed. When the model changes, the synchronization system 150 detects that an elements has changed in the model tool 110, for example, by receiving an event from the model tool 110. The software synchronization system 150 then instructs the development environment 130 to update the corresponding elements in the code. For example, if the developer renamed a model element IFoo to IBar, then the software synchronization system 150 instructs the development environment 130 to rename instances of IFoo to IBar in the code.

The other direction, reflecting changes to the code in the model, uses an association between the model and code for each element, called a NamingManager, that is generated by the model tool 110 when the code is generated. For example, the NamingManager may be defined in a C++ attribute within the code that does not affect the compiled software but is accessible during development. When a user loads a project, the development environment 130 informs the software synchronization system 150 through a load event. At that time, the software synchronization system 150 loads each NamingManager to track later changes to code elements. For example, the software synchronization system 150 can use reflection to identify each NamingManager attribute and instantiate a corresponding class that registers with the development environment 130 to receive element change events. When an element with a NamingManager changes, the development environment 130 informs the software synchronization system 150 through an element change event. Then the software synchronization system 150 informs the model tool 110.

Mapping Between Model Elements and Code Elements

The software synchronization system consists of three major components: a component that provides a mapping between model elements and corresponding code elements, a component that listens for changes in the model and triggers updates in the associated code, and a component that performs source code updates. This section describes the operation of the first of these components in further detail.

In some embodiments, an INamingManager interface provides the means to obtain the full name of a code element through a method GetFullName. This interface is defined in part as follows:

```
interface INamingManager
{
    string GetFullName (string namingToken, ModelElement mel,
    CodeGenerationLanguage codeGenerationLanguage)
}
```

To consistently modify elements of the source code, the software synchronization system determines both the old and the new states of the code element. For example, if the change is a rename, then the software synchronization system uses the old name to find elements that need to be modified and uses the new name to modify the found elements. The GetFullName method helps to calculate both old and new names of a given code element. GetFullName takes the following parameters: namingToken—the model element attribute defining the part of the code element name that changed; mel—the model element that is being modified, that defines rules for constructing the code element name, and that contains namespace information; and codeGenerationLanguage—the target language for the code generation. The target language affects how the element name is constructed. For example, in C#, the name of a property and the name of the field backing it differ only in their casing, but in VB.NET, the field name is also suffixed with "Value."

In some embodiments, a NamingManager abstract base class partially implements INamingManager. Each model element with generated code has an implementation of INamingManager. A given model element need only derive from this class and implement the CalculateFullName method. GetFullName calls CalculateFullName to perform steps specific to a given model element. This abstract class is defined as:

```
internal abstract class NamingManager<T> : INamingManager where T :
ModelElement
{
    // Implementation of INamingManager interface
    public string GetFullName (string namingToken, T mel,
    CodeGenerationLanguage codeGenerationLanguage);
    // implemented by each concrete NamingManager
    abstract protected string CalculateFullName(string
    namingToken, ModelElement mel, CodeGenerationLanguage
    codeGenerationLanguage) {...}
}
```

In some embodiments, each model element with corresponding generated code has a derivative of NamingManager for each type of element for which the software synchronization system handles changes. For example, the software synchronization system creates an EntityNamingManager for handling changes to the element itself or related class code, a PropertyNamingManager for handling changes to properties, and a FieldPropertyNamingManager for handling changes to fields. Each class corresponds to exactly one code element generated from the model element. The following is an example of a FieldPropertyNamingManager class.

```
[NamingManagerFor(typeof(DesignTimeMetaModel.PropertyInfo),
NamedElement.NameMetaAttributeGuidString, ElementKind.Field)]
internal class FieldPropertyNamingManager :
NamingManager<DesignTimeMetaModel.PropertyInfo>
{
    ...
}
```

In some embodiments, the software synchronization system implements CalculateFullName by concatenating the values of several attributes and special prefixes or suffixes (e.g., "Destination") for a property produced from an associated model element. The software synchronization system can use the resulting string to detect multiple types of changes to the corresponding code element.

In some embodiments, each derivative of NamingManager has the NamingManagerFor attribute applied to it. This attribute specifies the model element corresponding to the NamingManager instance, which model element's property causes the change of a corresponding code element (e.g., Name), and the kind of code element. The information in this attribute enables the software synchronization system to generically listen for changes in the abstract model and trigger the corresponding changes in the source code. For example, Visual Studio provides an event interface that receives an indication when changes occur to any element with this attribute.

Detecting Changes

As discussed above, the software synchronization system consists of three major components: a component that provides a mapping between model elements and corresponding code elements, a component that listens for changes in the model and triggers updates in the associated code, and a component that performs source code updates. This section describes the operation of the second of these components in further detail.

In some embodiments, the software synchronization system inspects each code assembly using .NET reflection when the development environment loads, discovers all NamingManagerFor attributes, and uses the discovered attributes to subscribe to relevant change events in the model. Visual Studio, for example, provides the ability to register for changes to an abstract model. For example, the NamingManagerFor attribute on PropertyNamingManager indicates that an event listener can be registered to detect property change events so that code can be regenerated when a property changes. Thus, when the development environment is loaded, the software synchronization system can register to receive notification of any changes in the model.

When the development environment passes a change in the model to a registered event handler, the software synchronization system looks at the list of discovered NamingManager classes to find ones correlated to the changed model element type. If the software synchronization system discovers a match for the changed model element, then the system uses the NamingManager class to calculate the old and new names of the code element. The NamingManager then executes code updates accordingly.

In some embodiments, if the developer changes the code first, such that the model needs to be updated, then the software synchronization system locates the model element through the mapping of the model element to the code element name collected when the development environment loaded the software project. As described above, the software synchronization system can use reflection when a project is loaded to create an initial association between model and code elements. Then the software synchronization system can extract the model element name from the code element name or from other stored information. After locating the model element, the software synchronization system performs the change on the model element, and then the system proceeds as described above when a model change occurs. The system may prompt the developer to ask if it is okay to proceed with the model element change to ensure that the developer did not accidentally cause the change.

Updating Source Code

As discussed above, the software synchronization system consists of three major components: a component that provides a mapping between model elements and corresponding code elements, a component that listens for changes in the model and triggers updates in the associated code, and a component that performs source code updates. This section describes the operation of the third component in further detail.

In some embodiments, the software synchronization system invokes an existing tool to propagate a change. For example, many popular development environments (e.g., Visual Studio) provide a global rename operation (also known as rename refactoring) for renaming variables or other definitions in source code. If a developer makes a change to one part of the model or the source code, the software synchronization system can invoke an appropriate operation of the existing tool. For example, the software synchronization system may propagate the change throughout the abstract model and invoke the global rename function of Visual Studio to propagate the change throughout the source code.

In some embodiments, the software synchronization system uses the Microsoft Visual Studio Code Model Application Programming Interface (API) to find the existing declaration of the code element based on the calculated old code element name. The Visual Studio code model offers automation clients the ability to discover code definitions in a project and modify those code elements. The code model automatically updates all referenced objects when a developer makes modifications in the code editor. The code model allows automation clients to avoid implementing a parser for Visual Studio languages in order to discover the high-level definitions in a project, such as classes, interfaces, structures, methods, properties, and so on. After the software synchronization system finds the correct declaration using the code model API, the system invokes the Microsoft Visual Studio rename refactoring API as described above to update the code with the new code element name.

Figures

The following figures illustrate some embodiments of the features of the software synchronization system described above.

Figure 2:
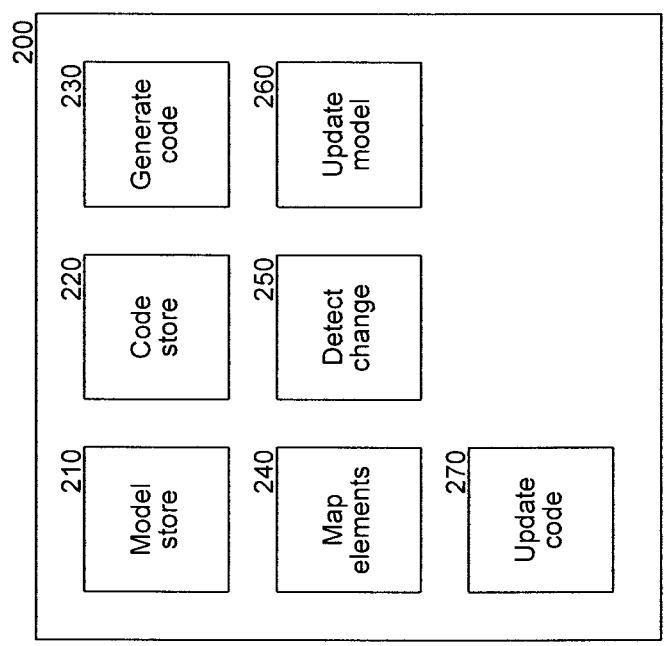
FIG. 2 is a block diagram that illustrates the components of the software synchronization system in one embodiment.

FIG. 2 is a block diagram that illustrates the components of the software synchronization system in one embodiment. A software synchronization system 200 contains a model store component 210, a code store component 220, a generate code component 230, a map elements component 240, a detect change component 250, an update model component 260, and an update code component 270. The model store component 210 stores a persistent version of the abstract model. The code store component 220 stores a persistent version of the source code. The generate code component 230 generates part of the source code using the information in the abstract model. The map elements component 240 identifies source code elements associated with a given model element and vice versa. The detect change component 250 detects when a developer changes a model element or a source code element and notifies other components. The update model component 260 updates the model based on changes detected to the source code. The update code component 270 updates the source code based on changes detected to the model.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
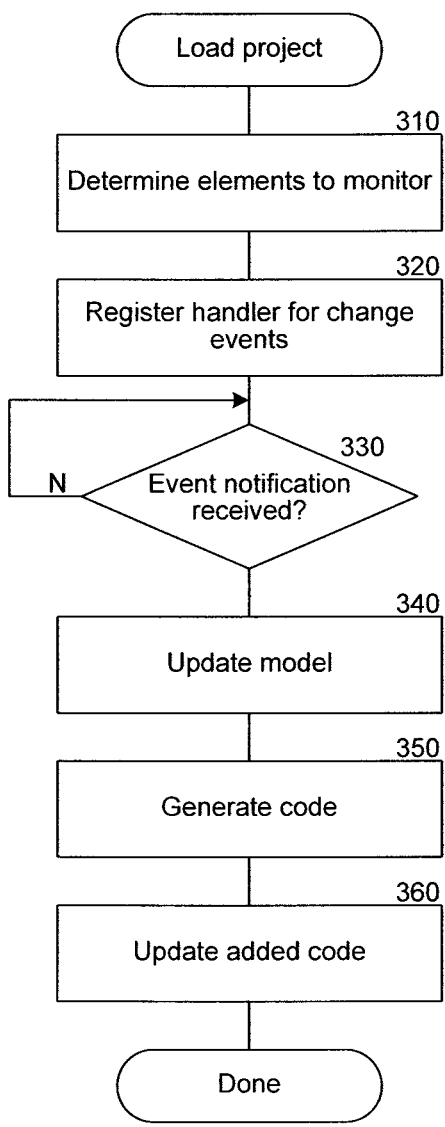
FIG. 3 is a flow diagram that illustrates the processing of the detect change component at load time in one embodiment.

FIG. 3 is a flow diagram that illustrates the processing of the detect change component at load time in one embodiment. The component is initially invoked when a development environment that uses the software synchronization system loads a software project. In block 310, the component determines the elements to be monitored for changes. For example, the component may use reflection to identify model or code elements flagged with an attribute that indicates that the component should propagate changes to that element throughout the project. In block 320, the component registers a handler for events indicating that one of the determined elements changed. For example, the component may use an interface provided by the development environment for detecting code or model changes. In decision block 330, if the component receives an event notification, then the component continues at block 340, else the component loops to block 330 and waits for receipt of an event.

In block 340, the component updates the model based on the detected change. For example, if the developer renamed a class, then the component renames all references to that class in the model. In block 350, the component prompts the generate code component to regenerate code based on the updated model. In block 360, the component updates the added source code (e.g., the code that is not generated) based on the change. After block 360, these steps conclude.

Figure 4:
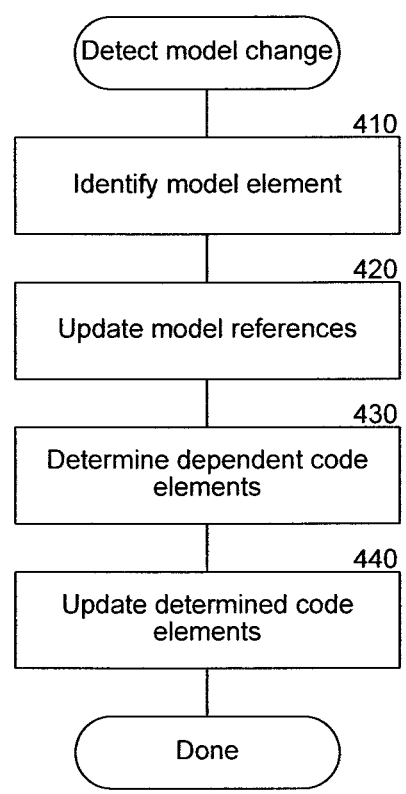
FIG. 4 is a flow diagram that illustrates the processing of the detect change component when a model change is detected in one embodiment.

FIG. 4 is a flow diagram that illustrates the processing of the detect change component when a model change is detected in one embodiment. In block 410, the component identifies the model element that changed. In block 420, the component updates references to the changed element throughout the model. In block 430, the component determines code elements that depend on the changed model element. In block 440, the component updates the determined code elements. For example, if a variable is renamed, the software synchronization system updates the name first in the model and then in the source code. After block 440, these steps conclude.

Figure 5:
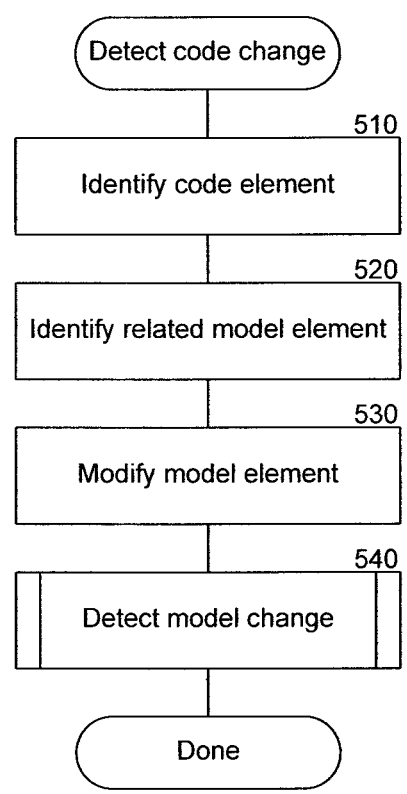
FIG. 5 is a flow diagram that illustrates the processing of the detect change component when a code change is detected in one embodiment.

FIG. 5 is a flow diagram that illustrates the processing of the detect change component when a code change is detected in one embodiment. In block 510, the component identifies the code element that changed. For example, the component may receive a name of the changed element from an event interface and then query the elements of the software project to find a matching name. In block 520, the component identifies a related model element. For example, the component may inspect the identified code element to determine whether an association exists with a particular model element. In block 530, the component modifies the identified related model element. In block 540, the component invokes the process described in FIG. 4 to propagate the detected change throughout the project. After block 540, these steps conclude.

From the foregoing, it will be appreciated that specific embodiments of the software synchronization system have been described herein for purposes of illustration, but that various modifications may be made without deviating from the spirit and scope of the invention. For example, although software has been described, other fields where a model and a document are closely related could also use the methods described. UML in particular is a modeling language suitable for modeling many systems and is often used in fields other than software. Accordingly, the invention is not limited except as by the appended claims.

We claim:

1. A method in a synchronization system for synchronizing changes in a software environment having an abstract model and source code generated from the abstract model, a model tool having generated the source code from the abstract model, the changes to the abstract model being made by the model tool and the changes to the source code being made by a development environment, the method comprising:
  upon receiving by the synchronization system from the model tool a notification of a model change that modifies model element of the abstract model,
    automatically determining source code elements of the source code that are dependent on the changed model element; and
    requesting the development environment to modify the determined source code elements of the source code without the model tool regenerating source code such that the development environment attempts to make the requested modifications to the source code elements and if any attempt fails, the development environment rolls back the requested modifications that were previously made to the source code and the model tool rolls back the modification to the model element of the abstract model of the model change; and
  upon receiving by the synchronization system from the development environment a notification of a source code change that modifies a source code element of the source code,
    automatically determining model elements of the abstract model that are dependent on the changed source code element; and
    requesting the model tool to modify the determined model elements so that the model tool changes instances of the determined model elements throughout the abstract model such that the model tool makes attempts to make the requested modifications to the model elements and if any attempt fails, the model tool rolls back the requested modifications that were previously made to the abstract model and the development environment rolls back the modification to the source code element of the source code of the source code change.

2. The method of claim 1 wherein the change is a rename of a variable.

3. The method of claim 1 wherein the change is a modification of a return type of a function.

4. The method of claim 1 wherein the change is a modification of a parameter type of a function.

5. The method of claim 1 wherein the abstract model is in UML.

6. The method of claim 1 wherein determining elements of the source code comprises invoking a code model API of a development environment.

7. The method of claim 1 wherein the requesting of the development environment comprises invoking a renaming API of the development environment.

8. The method of claim 1 wherein determining source code elements of the source code comprises enumerating source code elements and comparing a name of each element source code with a name of the changed model element.

9. A system for synchronizing changes between an abstract model and related source code in a development environment, the system comprising:
  a model store configured to store the abstract model;
  a code store configured to store the related source code, the source code initially having been generated from the abstract model using a model tool;
  a memory storing computer-executable instructions of:
    an update model component configured to update the abstract model when a change is detected in the source code;
    an update code component configured to update the source code when a change is detected in the abstract model without regenerating the source code from the abstract model; and
    a detect change component configured to:
      detect changes to the abstract model and the source code;
      when a change is detected in the source code, notifying the update model component to update the abstract model such that if the update to the abstract model fails, the detected change to the source code and any resulting change to the abstract model are rolled back; and
      when a change is detected in the abstract model, notifying the update code component to update portions of the related source code such that if the update to a portion of the source code fails, the detected change to the abstract model and any resulting change to the source code are rolled back; and
  a processor for executing the computer-executable instructions in the memory.

10. The system of claim 9 including a generate code component configured to generate code based on the abstract model.

11. The system of claim 10 wherein the generate code component generates code using partial classes.

12. The system of claim 9 including a map elements component configured to map elements of the abstract model to related elements of the source code.

13. The system of claim 9 wherein the update model component is further configured to prompt a user before updating the abstract model.

14. A computer-readable storage medium excluding signal transmission medium encoded with instructions for controlling a computer system to monitor changes to a model of software code, the changes being made using transaction semantics, by a method comprising:
  determining model elements of a model to be monitored for changes;
  registering an event handler for detecting changes made using a model tool to the determined model elements, the model having been created with the model tool, the software code with code elements having been generated from the model by the model tool; and
  when a change to a model element is received through a registered event handler, updating code elements of the software code associated with the changed model element using a transaction such that if any update to a code element fails, the transaction is not committed and the change to the model element is rolled back, the updating being performed without the model tool regenerating software code.

15. The computer-readable storage medium of claim 14 wherein determining model elements comprises using reflection to identify attributes associated with each element.

16. The computer-readable storage medium of claim 14 wherein determining model elements is performed upon loading a software project in a development environment.

17. The computer-readable storage medium of claim 14 including using a name mapping interface to identify the code elements associated with the changed model element.

18. The computer-readable storage medium of claim 14 wherein the change is a rename operation.

19. The system of claim 10 wherein the generate code component generates header files and source files that define classes of the abstract model and that contain placeholders where a developer can fill in additional implementation details.

<p align="center">* * * * *</p>